US009145942B2

(12) United States Patent
Boston et al.

(10) Patent No.: US 9,145,942 B2
(45) Date of Patent: Sep. 29, 2015

(54) PRESTRESSING DEVICE HAVING CIRCUMFERENTIAL ACTIVITY

(75) Inventors: Eric Jacques Boston, Cesson (FR); Michel André Bouru, Montereau-sur-le-Jard (FR); Laurent Jablonski, Melun (FR); Philippe Gérard Edmond Joly, Vaux le Penil (FR)

(73) Assignee: SNECMA, Paris (FR)

( * ) Notice: Subject to any disclaimer, the term of this patent is extended or adjusted under 35 U.S.C. 154(b) by 788 days.

(21) Appl. No.: 13/388,461

(22) PCT Filed: Jul. 23, 2010

(86) PCT No.: PCT/EP2010/060741
§ 371 (c)(1),
(2), (4) Date: Feb. 2, 2012

(87) PCT Pub. No.: WO2011/015474
PCT Pub. Date: Feb. 10, 2011

(65) Prior Publication Data
US 2012/0128490 A1    May 24, 2012

(30) Foreign Application Priority Data
Aug. 5, 2009  (FR) ...................... 09 55518

(51) Int. Cl.
*F16B 39/24*    (2006.01)
*F16F 1/32*    (2006.01)
(Continued)

(52) U.S. Cl.
CPC ............... *F16F 1/328* (2013.01); *F16C 25/083* (2013.01); *F16F 1/027* (2013.01); *F01D 25/164* (2013.01)

(58) Field of Classification Search
CPC ........ F01D 25/164; F16B 39/24; F16B 43/02; F16F 1/18; F16F 1/34
USPC .................. 267/161; 384/517, 563, 611, 620; 415/229; 416/174
See application file for complete search history.

(56) References Cited

U.S. PATENT DOCUMENTS 3,237,739 A  *  3/1966  Pritchard ..................... 192/99 A
4,541,514 A     9/1985  Reik
(Continued)

FOREIGN PATENT DOCUMENTS

DE    37 22 243    1/1989
DE    44 10 963    10/1994
(Continued)

OTHER PUBLICATIONS

International Search Report issued on Aug. 23, 2010 in PCT/EP10/060741 filed on Jul. 23, 2010.
(Continued)

*Primary Examiner* — Nathaniel Wiehe
*Assistant Examiner* — Woody A Lee, Jr.
(74) *Attorney, Agent, or Firm* — Oblon, McClelland, Maier & Neustadt, L.L.P.

(57) ABSTRACT

A prestressing device extending about an axis between a first plane and a second plane, the first plane being located at a predetermined distance from the second plane, each plane being perpendicular to the axis. The device includes at least three deformation areas. The deformation areas extend in the first plane. The device further includes, between each deformation area, a planar contact surface extending in the second plane.

7 Claims, 3 Drawing Sheets

(51) Int. Cl.
  *F16F 1/02* (2006.01)
  *F16C 25/08* (2006.01)
  *F01D 25/16* (2006.01)

(56) References Cited

U.S. PATENT DOCUMENTS

| | | | | |
|---|---|---|---|---|
| 5,009,090 | A * | 4/1991 | Beattie et al. | 70/326 |
| 5,622,358 | A * | 4/1997 | Komura et al. | 267/166 |
| 7,520,190 | B2 * | 4/2009 | Hasegawa et al. | 74/7 E |
| 8,602,656 | B2 * | 12/2013 | Mashino et al. | 384/517 |
| 2011/0014036 | A1 * | 1/2011 | Boening et al. | 415/177 |

FOREIGN PATENT DOCUMENTS

| | | | | |
|---|---|---|---|---|
| DE | 2007057309 | * | 10/2009 | F02C 7/24 |
| JP | 6-280912 | A | 10/1994 | |
| JP | 2007-241 | A | 1/2007 | |

OTHER PUBLICATIONS

U.S. Appl. No. 13/388,317, filed Feb. 1, 2012, Boston, et al.
Office Action issued Oct. 28, 2014 in Japanese Patent Application No. 2012-523280 (with English language translation).

* cited by examiner

PRESTRESSING DEVICE HAVING CIRCUMFERENTIAL ACTIVITY

BACKGROUND OF THE INVENTION

1. Field of the Invention

The present invention relates to a prestressing device intended to ensure contact between rolling elements and their rolling track.

2. Description of the Related Art

It applies in particular to an impeller rotor, with no fairing, for a turbine engine. In these devices, a nut is provided for pressing one of the bearings against the rim of a collar. A locking washer is then provided between the bearing and the nut so as to fix this nut in rotation within the housing of the polygonal ring.

A prestressing device is then advantageously provided in order to permanently generate a stress between the pieces. Known prestressing devices include star-shaped springs known as Ringspann washers. Also known are washers with a shape similar to that of Belleville washers. These washers are conical so as to function as a spring and thus permanently stress the pieces in question.

It has been noted that there is a problem of the pieces wearing when the known prestressing devices are used and in particular in the context of mechanical assemblies which are subject to high vibration levels such as, for example, turbine engines.

BRIEF SUMMARY OF THE INVENTION

The object of the invention is in particular to provide a solution to this problem.

The subject of the invention is a prestressing device making it possible to reduce the wear of pieces which must be subjected to prestress in all types of assembly.

To this end it proposes a prestressing device which extends about an axis between a first plane substantially perpendicular to the axis and a second plane substantially parallel to the first plane and axially offset with respect to the latter, the device comprising at least three deformation zones, characterized in that the deformation zones extend within the first plane, and in that the device comprises, between each deformation zone, a planar contact surface extending within the second plane.

According to the invention, the device is thus no longer conical but comprises two parts which each extend within a plane perpendicular to its axis. The deformation zone extends within the second plane. It will ensure surface contact with a first piece, in particular a locking washer or a nut. The planar contact surfaces extend within the second plane and hence ensure surface contact with a second piece, in particular one of the bearings of the turbine engine. By virtue of these contact surfaces, the prestressing force is better distributed and a significant decrease is thus obtained in the wear resulting from the contact between the pieces which must be subjected to prestress. The lifetime of the pieces in question is thus increased.

The device preferably comprises inclined transition zones between each deformation zone and the contact surfaces adjacent to the deformation zone. Each inclined transition zone advantageously comprises a first rounded end part connected to one of the deformation zones, a second end part connected to one of the planar contact surfaces and an essentially planar central part between the first and second end parts. This makes it possible to considerably limit the stress concentration.

Each deformation zone can comprise a first recess extending radially inward and a second recess extending radially outward. It has been noted that such a shape ensures an effective deformation when the device is fitted between the pieces which are to be permanently stressed.

For each of the contact surfaces, two successive planar contact surfaces are advantageously separated from each other by a predetermined distance. This makes it possible to better distribute the prestressing force over the circumference of the pieces which are to be stressed.

The number of planar contact surfaces is preferably chosen to be between ten and twenty, and more particularly between thirteen and seventeen. It has been noted that the distribution of the prestressing force is optimized by the selection of these values.

The present invention also relates to a rotor, in particular an impeller rotor, with no fairing, for a turbine engine, comprising a prestressing device as described above.

BRIEF DESCRIPTION OF THE SEVERAL VIEWS OF THE DRAWINGS

The invention will be better understood and other details, features and advantages of the present invention will become more apparent on reading the following description, made by way of non-limiting example and with reference to the attached drawings, in which.

DETAILED DESCRIPTION OF THE INVENTION

Figure 1:
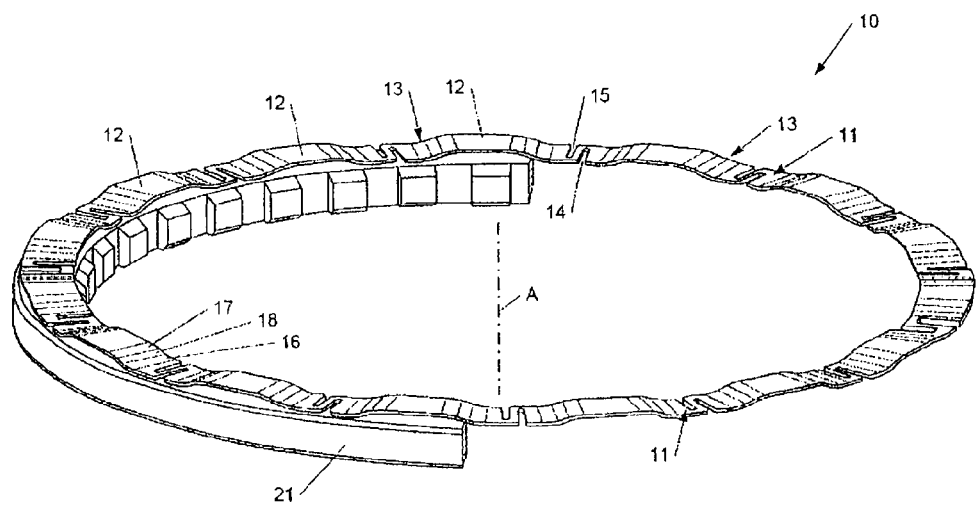
FIG. 1 is a partial perspective schematic view of a prestressing device, according to the invention, on a nut.

Reference is made first to FIG. 1 which shows a prestressing device 10 consisting of an annular element.

This device consists of a succession of deformation zones 11, transition zones 13 and planar contact surfaces 12.

The deformation zones 11 extend within a first plane perpendicular to the axis A of the device. Each deformation zone comprises in particular recesses 14 and 15. As illustrated in FIG. 1, a first recess 14 extends inward, in other words toward the axis A of the device. The second recess 15 extends radially outward.

The transition zones 13 each have rounded end parts 16 and 17 and an essentially planar central part 18.

The planar contact surfaces 12 extend within a second plane parallel to the first plane. The distance between the first plane and the second plane is determined as a function of the desired travel of the device.

Figure 2:
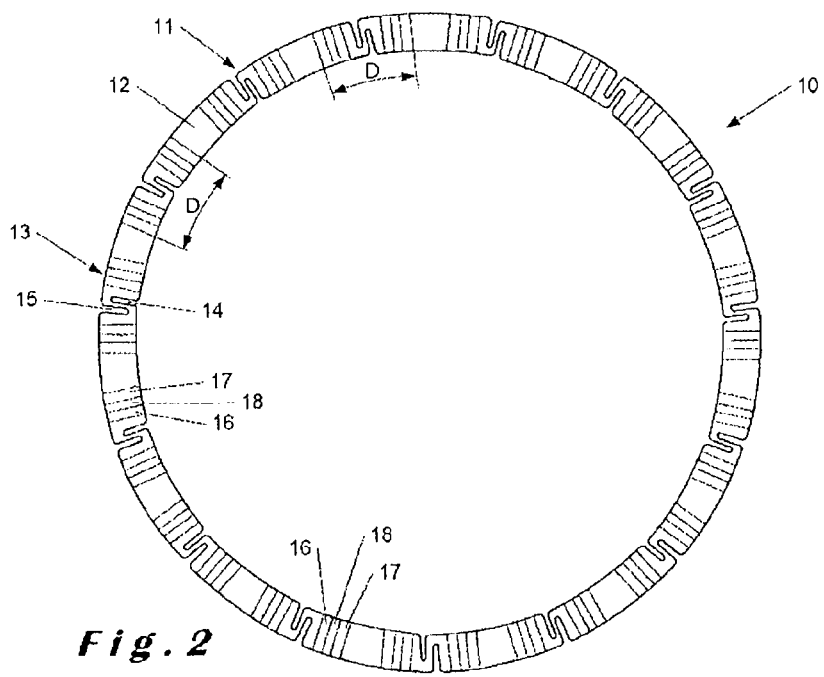
FIG. 2 is a schematic view from above of the prestressing device according to FIG. 1.

The prestressing device 10 (FIG. 2) comprises, in the example shown, a series of fifteen contact surfaces 12. Between ten and twenty contact surfaces are generally provided, preferably between thirteen and seventeen contact surfaces.

Two successive planar contact surfaces are separated from each other by a predetermined distance (D) which is preferably the same for each successive series of two planar contact surfaces so as to distribute the forces homogeneously.

Figure 3:
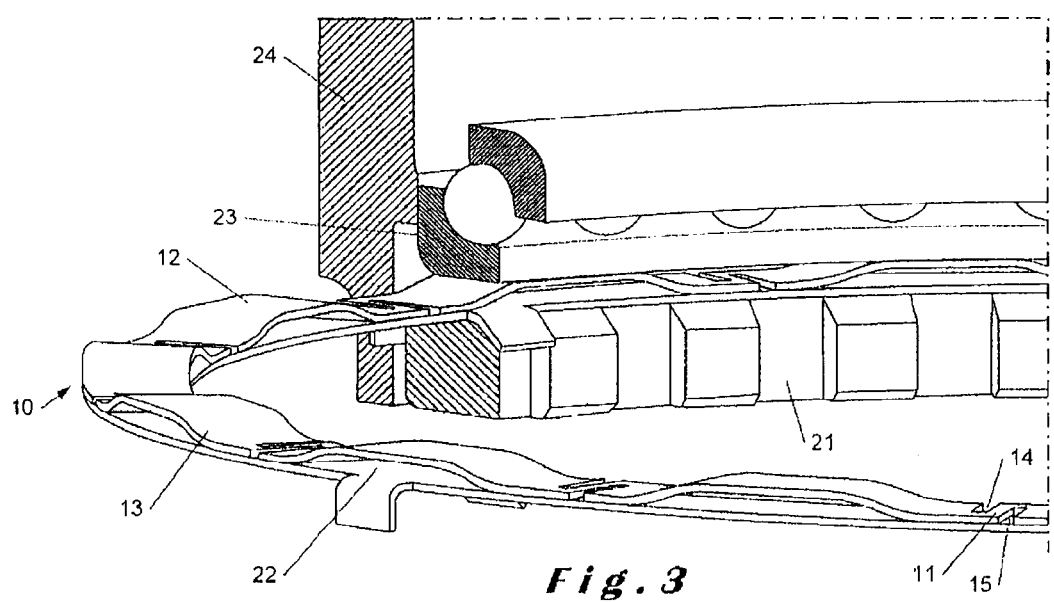
FIG. 3 is a partial perspective schematic view of the device in FIG. 1 placed between the nut and the locking washer, on the one hand, and the bearing, on the other hand.

When the prestressing device is fitted as shown in FIG. 3, it can be seen that the device 10 is placed between the unit formed by a nut 21 and its locking washer 22, on the one hand, and a bearing 23 (a ball bearing in the example shown), on the other hand. The bearing 23 is housed in a polygonal ring 24. The lower surfaces of the deformation zones 11 are in contact with the upper surface of the locking washer 22. The planar contact surfaces 12 are in contact with the lower surface of the bearing 23. Genuine surface contact between the different pieces is thus ensured.

In an alternative embodiment (not shown), the number of contact surfaces per element can be less than 10.

Figure 4:
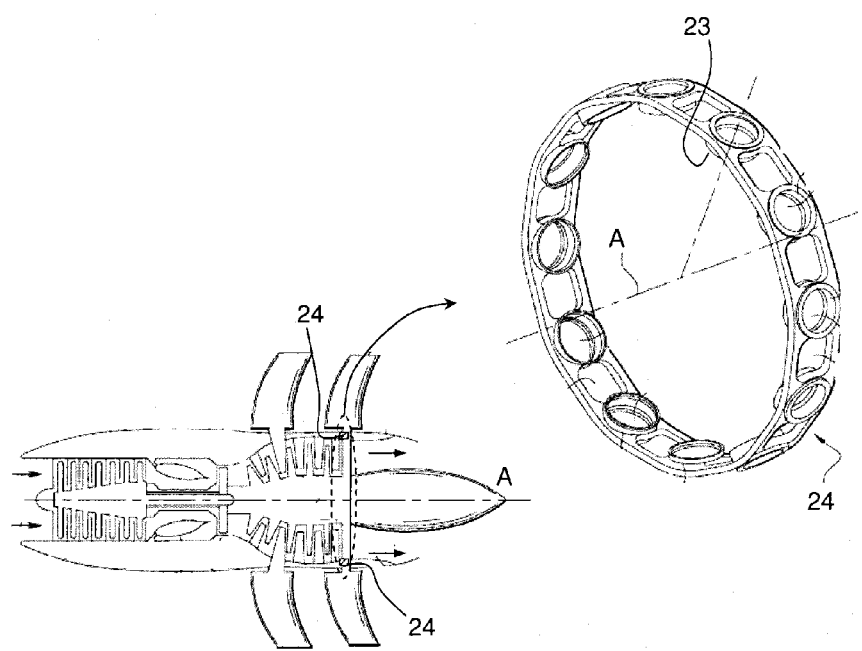
FIG. 4 is a schematic view of a turbine engine with an impeller rotor with no fairing with the assembly shown in FIG. 3.

The prestressing device according to the invention has been shown fitted in a rotor assembly, which may be an impeller rotor, with no fairing, for a turbine engine, as shown in FIG. 4. It may, however, be used in other assemblies where a permanent stress is required. The device is particularly advantageous in mechanical units which are subjected to high vibration levels such as, for example, turbine engines.

The invention claimed is:

1. A prestressing device for an assembly in a turbine engine which extends about an axis between a first plane substantially perpendicular to the axis and a second plane substantially parallel to the first plane and axially offset with respect to the first plane, the device comprising:
   at least three deformation zones, wherein the deformation zones extend within the first plane;
   between each deformation zone, a planar contact surface extending within the second plane; and
   an inclined transition zone between each deformation zone and the contact surface adjacent to the deformation zone,
   wherein each inclined transition zone comprises a first rounded end part connected to one of the deformation zones, a second end part connected to one of the planar contact surfaces, and an essentially planar central part between the first and second end parts,
   wherein the prestressing device is an annular element presenting an inner circumferential surface and an outer circumferential surface, and
   wherein each of the deformation zones, each of the planar contact surfaces, and each of the inclined transition zones extend radially from the inner circumferential surface to the outer circumferential surface.

2. The device as claimed in claim 1, wherein each deformation zone comprises a first recess extending radially inward and a second recess extending radially outward.

3. The device as claimed in claim 1, wherein, for each of the contact surfaces, two successive planar contact surfaces are separated from each other by a predetermined distance.

4. The device as claimed in claim 1, wherein the device comprises between ten and twenty planar contact surfaces.

5. A rotor for a turbine engine, comprising a prestressing device as claimed in claim 1.

6. The device as claimed in claim 4, wherein the device comprises between thirteen and seventeen planar contact surfaces.

7. An assembly in a turbine engine comprising:
   a nut;
   a locking washer;
   a bearing; and
   the prestressing device as claimed in claim 1,
   wherein the nut abuts the locking washer,
   wherein the deformation zones abut an upper surface of the locking washer, and
   wherein the planar contact surfaces abut a lower surface of the bearing.

* * * * *